INVENTORS
Robert C. Beckwith,
& Robert W. Hecker, Jr.

ATTORNEYS

INVENTORS
Robert C. Beckwith,
& Robert W. Hecker, Jr.

Barnard, McEllynn & Rising
ATTORNEYS

Feb. 11, 1969    R. C. BECKWITH ET AL    3,426,377
DOCKBOARD
Filed May 3, 1967    Sheet 3 of 4
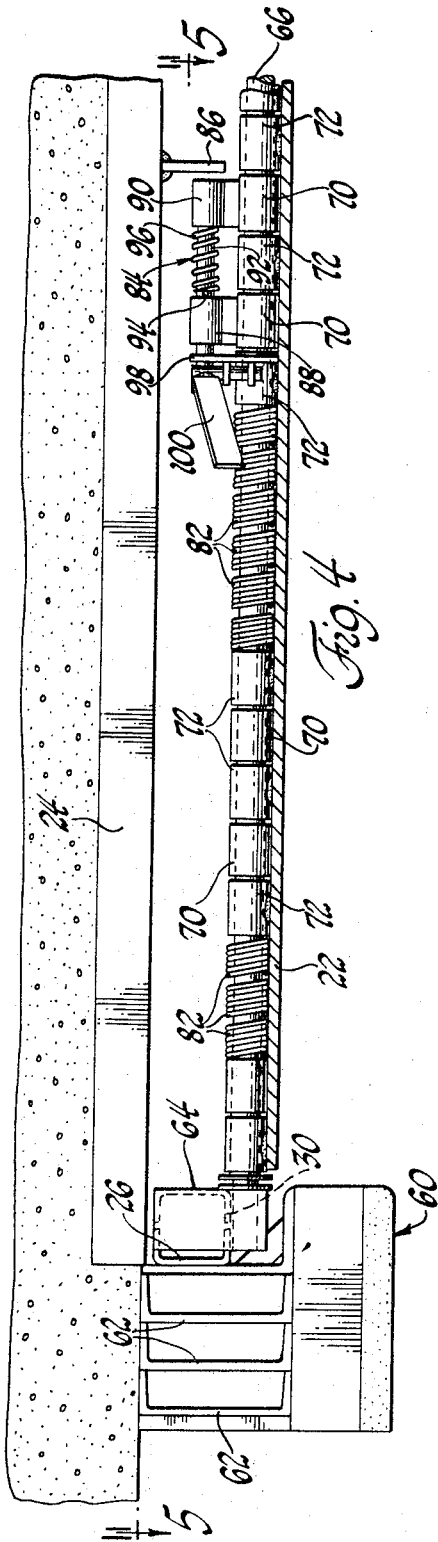
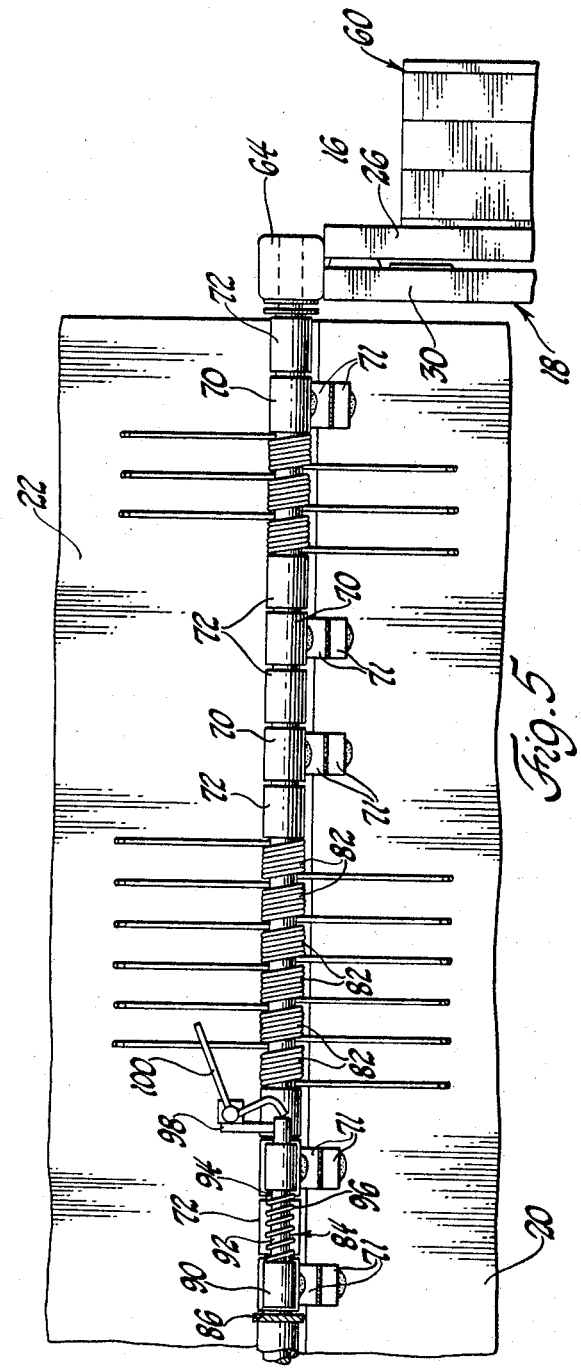
INVENTORS
Robert C. Beckwith,
& Robert W. Hecker, Jr.
Bernard, McElhynn & Leising
ATTORNEYS

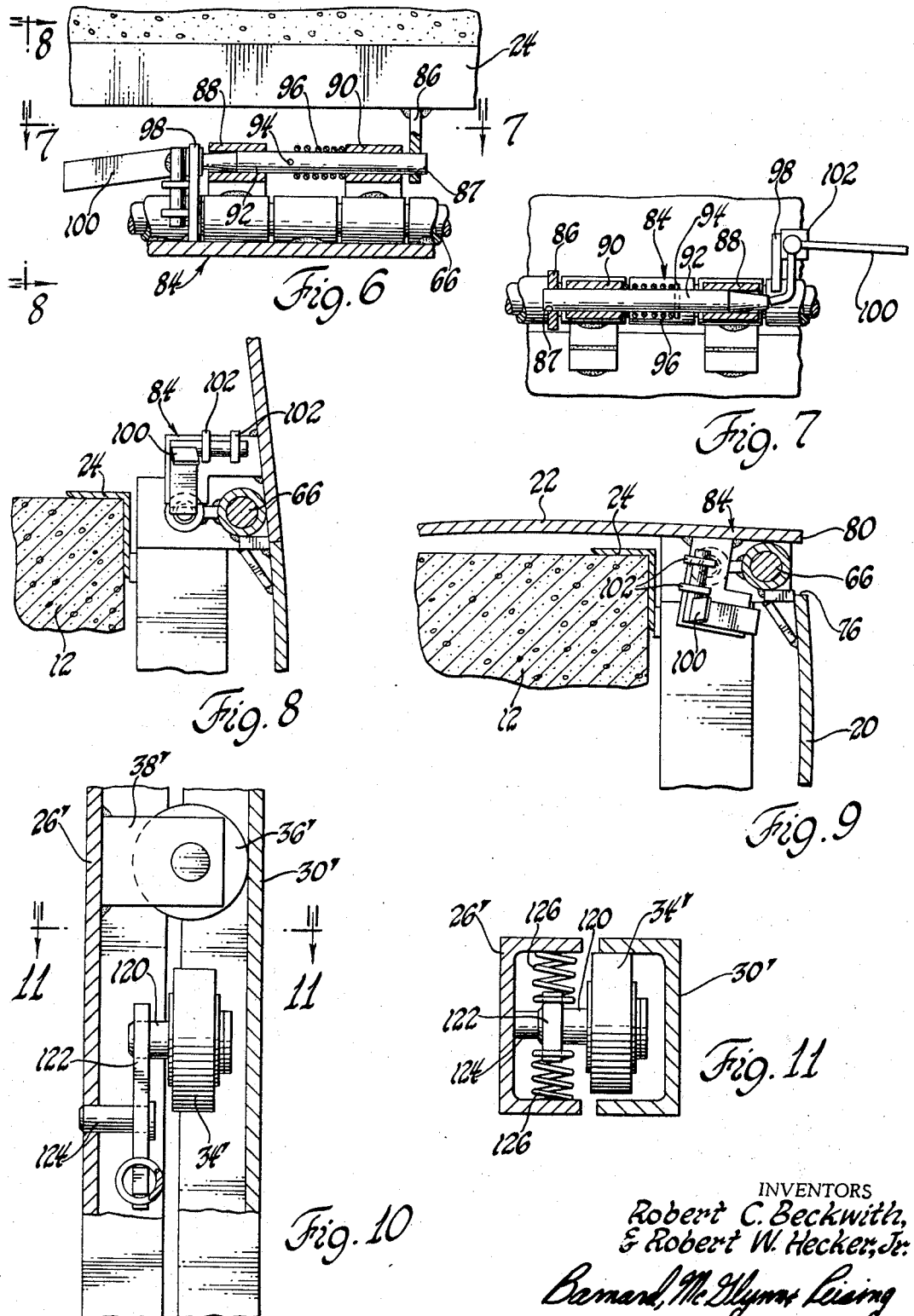

United States Patent Office 3,426,377
Patented Feb. 11, 1969

3,426,377
DOCKBOARD
Robert C. Beckwith, Milwaukee, Wis., and Robert W. Hecker, Jr., Clare, Mich., assignors to Loomis Machine Company, Clare, Mich., a corporation of Michigan
Filed May 3, 1967, Ser. No. 635,822
U.S. Cl. 14—71      21 Claims
Int. Cl. B65g 11/12, 11/18

ABSTRACT OF THE DISCLOSURE

A dockboard comprising a support frame means adapted to be attached to a dock, carriage means supported by the suport frame means for vertical movement relative thereto, a lip section and a platform section supported by the carriage means for rotation independently of one another about a common axis, and locking means for selectively preventing relative rotation between the lip section and the platform section. The lip section and platform section may be locked together to be moved between a vertical stored position and a substantially horizontal cross traffic position to carry traffic between a vehicle and a dock. The locking means may be moved to the unlocked position so that the platform section may be moved from the vertical stored position independently of the lip section for engaging the upper surface of the dock to define an end load position.

---

Most of the dockboards known in the prior art include assemblies which are permanently installed in a large recess in a dock. Docks are normally made of concrete and it is, therefore, expensive to prepare the dock during construction for receiving and supporting such a dockboard. Dockboards of the type which have heretofore been disposed in front of the dock normally require a large and expensive support structure and consume a large amount of space in front of the dock.

A recently developed dockboard solves a few of these problems, and includes a ramp with a rear edge for resting upon the dock and a front lip for resting upon a vehicle positioned adjacent the dock to carry traffic. The ramp is rotatably supported by a support structure and is normally stored in the vertical position below dock level immediately in front of the dock. It frequently occurs, however, that the bed of a truck is loaded (or is to be loaded) to its fullest extent and cargo is positioned all the way to the rear edge of the bed of the truck. Therefore, such a ramp cannot be moved to the cross traffic position and it is difficult, if not impossible, to move cargo over the ramp when vertically disposed in front of the dock.

Accordingly, it is an object and feature of this invention to provide a dockboard adapted to be attached to the front of a dock and including a ramp which has an end load position allowing cargo to be removed from or disposed on the end of the bed of a truck positioned adjacent the dock and which may be moved to a cross traffic position extending between the dock and the bed of an adjacent truck.

Another object and feature of this invention is to provide a dockboard adapted to be attached to a dock and including a ramp adapted to extend between a dock and an adjacent vehicle when in a cross traffic position, means for storing the ramp in a substantially vertical position so as to extend at least partially above dock level and allowing the ramp to move to the cross traffic position, and vice versa, the ramp including a lip section which extends below dock level in the stored position and a platform section which normally extends above dock level in the stored position with the platform section being rotatable independently of the lip section for engaging the upper surface of the dock to define an end load position of the ramp.

A further object and feature of this invention is to provide a dockboard including support frame means adapted to be attached to a dock and carriage means movably supported by the support frame means with a ramp rotatably supported by the carriage means and yieldable means operatively interconnecting the support frame means and the carriage means for allowing the carriage means to move horizontally relative to the support frame means.

In general, these and other objects and features of this invention may be attained in a preferred embodiment of the instant invention which includes a support frame means adapted to be attached to the front face of a dock and carriage means guidably supported for vertical movement by the support means. A shaft means is supported by the carriage means. A lip section and a platform section are rotatably connected to the shaft for rotation about a common axis. Biasing means interconnect the lip section and the platform section to urge the respective sections to rotate toward one another, i.e., toward abutting relationship with one another. There is also included locking means having a first position for preventing relative rotation between the lip section and the platform section and a second position for allowing rotation of the platform section while preventing rotation of the lip section. When the lip section and platform section are locked together, they form a ramp which may be moved to a substantially horizontal position with the lip section resting upon the bed of an adjacent vehicle and the platform section resting upon the upper surface of the dock to provide a cross traffic position. The moment produced by the weight of the lip section is greater than that provided by the platform section so that when the two sections are locked together, they are biased toward the vertical stored position where the platform section projects above the upper surface of the dock. In the vertical stored position, the locking means may be moved to the second position to allow the platform section to be rotated to a substantially horizontal position engaging the upper surface of the dock to carry traffic between the bed of a vehicle and the dock, such a position being an end load position.

Other objects, features and attendant advantages of the present invention will be readily appreciated as the same becomes better understood by reference to the following detailed description when considered in connection with the accompanying drawings wherein:

FIGURE 4 is a cross-sectional view taken substantially along line 4—4 of FIGURE 1;

FIGURE 5 is a cross-sectional view taken substantially along line 5—5 of FIGURE 4;

FIGURE 6 is an enlarged fragmentary view of a preferred embodiment of the locking means of the instant invention;

FIGURE 7 is a cross-sectional view taken substantially along line 7—7 of FIGURE 6;

FIGURE 8 is a cross-sectional view taken substantially along line 8—8 of FIGURE 6;

FIGURE 9 is a view similar to FIGURE 8 but showing the end load position;

FIGURE 10 is a fragmentary cross-sectional view of a modification of the instant invention; and FIGURE 11 is a cross-sectional view taken substantially along the line 11—11 of FIGURE 10.

Figure 1:
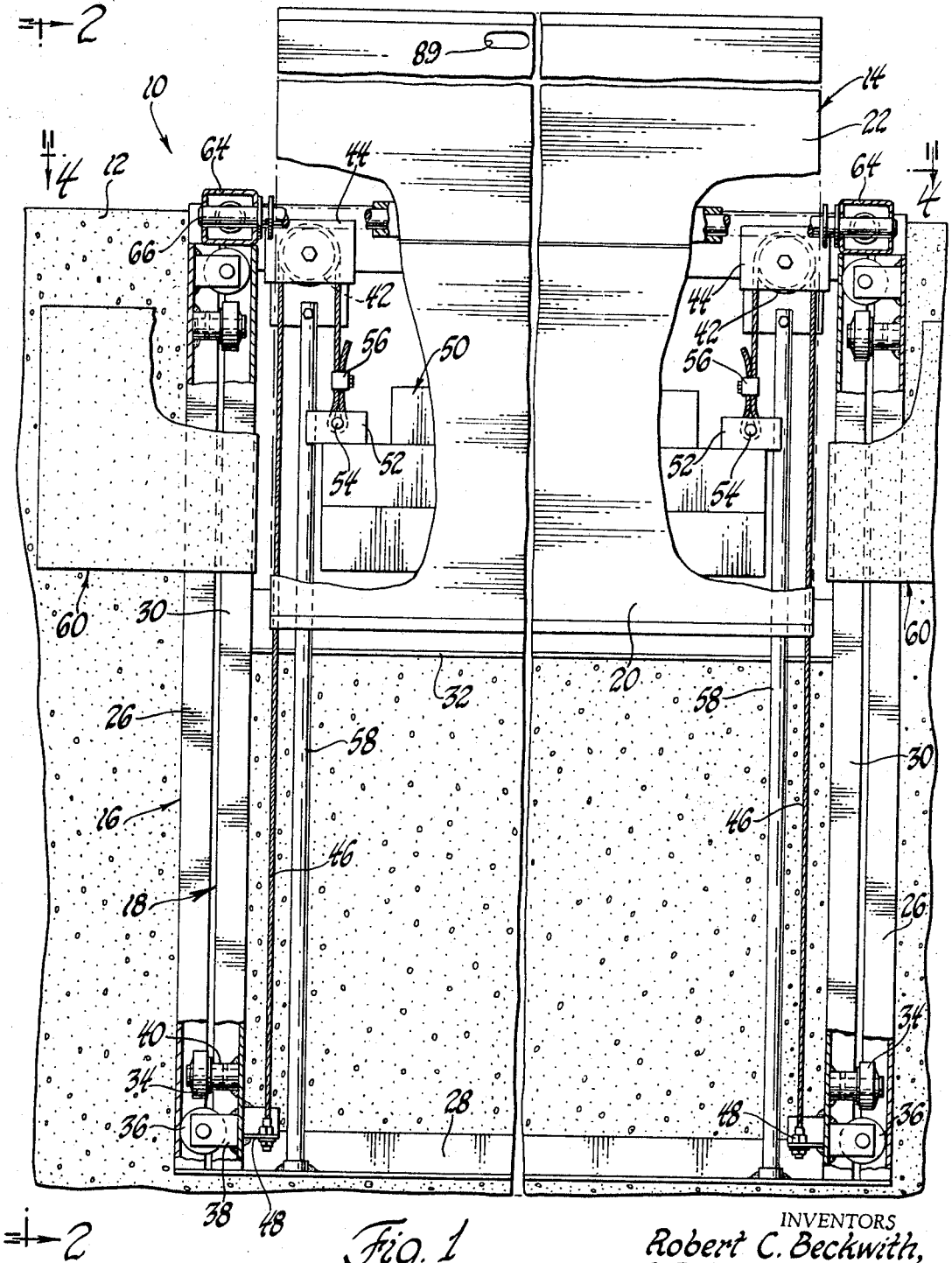
FIGURE 1 is an elevational view of a preferred embodiment of the instant invention.

Referring now to the drawings, wherein like numerals indicate like or corresponding parts throughout the several views, a preferred embodiment of the dockboard of the instant invention is generally shown at 10. The dockboard is adapted to be attached to the front face of a dock 12. The dockboard includes a ramp generally indicated at 14. The ramp 14 is adapted to extend between the upper surface of the dock 12 and the bed of an adjacent vehicle when in the cross traffic position as illustrated in full lines in FIGURE 2. There is also included a support frame means, generally indicated at 16, and a carriage means, generally indicated at 18, for storing the ramp 14 in a substantially vertical position so as to extend at least partially above the upper surface of the dock 12 as illustrated in phantom in FIGURE 2 and for allowing the ramp 14 to rotate to the cross traffic position illustrated in full lines in FIGURE 2. The ramp 14 includes a lip section 20, which extends below dock level in the stored position as illustrated in phantom in FIGURE 2, and a platform section 22, which normally extends above dock level in the stored position as illustrated in phantom in FIGURE 2. As will be described more specifically hereinafter, the platform section 22 is rotatable independently of the lip section 20 for engaging the upper surface of a dock to define an end load position as illustrated in FIGURES 3 and 9.

The support frame means 16 is adapted to be attached to the face of a dock and includes the angle iron member 24, the channel members 26, and the angle iron cross support 28. The channel members 26 are welded or otherwise secured to the upper member 24 and the cross support 28.

The carriage means 18 includes the channel members 30 which are interconnected by structural members, one of which is shown at 32. The channel members 30 support the rollers 34 and 36 through the plates 38 and 40 respectively, the rollers 34 and 36 being in rolling engagement with the channel members 26.

A pair of pulleys 42 are rotatably attached to the members 44 which are in turn secured to the angle iron member 24 of the support frame means 16. The cord-like strands 46 are attached to the channels 30 of the carriage means 18, as indicated at 48, pass over the pulleys 42, and are attached to a counterweight, generally indicated at 50. A pair of spaced plates 52 are welded or otherwise secured to the counterweight 50 at each end thereof and support a dowel pin 54, or the like. Each cord-like strand 46 is looped about one of the dowel pins 54 and is clamped by a clamp 56. Also included are the guide members 58 which are attached to the support frame means 16 for maintaining the counterweight 50 in a vertical plane. That is to say, the plates 52 are disposed on opposite sides of the respective guide members 58 to prevent the counterweight 50 from swinging out of the vertical plane passing through the guide members 58. The counterweight 50 nearly balances the combined weight of the carriage means 18 and the ramp 14. The channel members 30 of the carriage means 18 bottom out and engage the member 28, as illustrated in FIGURE 1, for limiting downward movement of the carriage means 18. Thus, the support frame means 16 supports the carriage means 18 when the ramp 14 is in the stored position as illustrated in phantom in FIGURE 2 and when the platform section 22 is in the end load position illustrated in FIGURES 3 and 9.

There is also included a bumper means, generally indicated at 60, which are attached to the support frame means 16 through the respective channel members 62 and extend over at least a portion of the channel members 26 and 30 of the support frame means 16 and the carriage means 18 respectively for protecting same.

A box-like member 64 is secured by welding or the like to the top of each channel member 30. Each box-like member 64 has an elongated slot 66 therein as best illustrated in FIGURE 3. A spring 68 is disposed in each box-like member 64. A shaft means 66 is supported in the elongated slots 66 of the box-like members 64. The springs 68 act against the shaft means 66 so that the shaft means 66 is in effect yieldably supported by the carriage means 18. That is, that shaft means 66 may move horizontally against the biasing action of the springs 68. The lip section 20 and the platform section 22 are each respectively rotatably attached to the shaft means 66 for rotation about a common axis through piano-type hinge means. The tubular members 70 are disposed about the shaft means 66 and are attached to the lip section 20 through the members 71. The tubular members 72 are disposed about the shaft means 66 and are welded to the platform section 22 as best illustrated in FIGURE 4.

Figure 2:
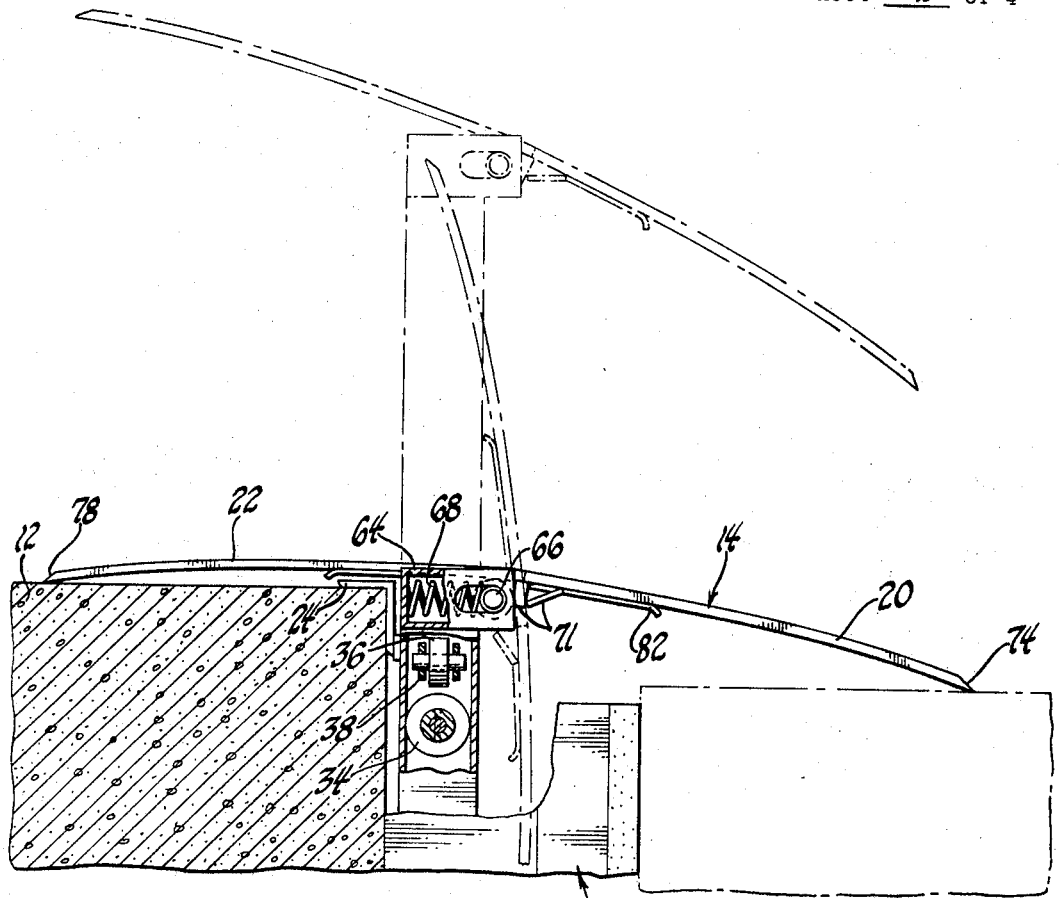
FIGURE 2 is a fragmentary view taken substantially along line 2—2 of FIGURE 1 and showing moved positions in phantom.
Figure 3:
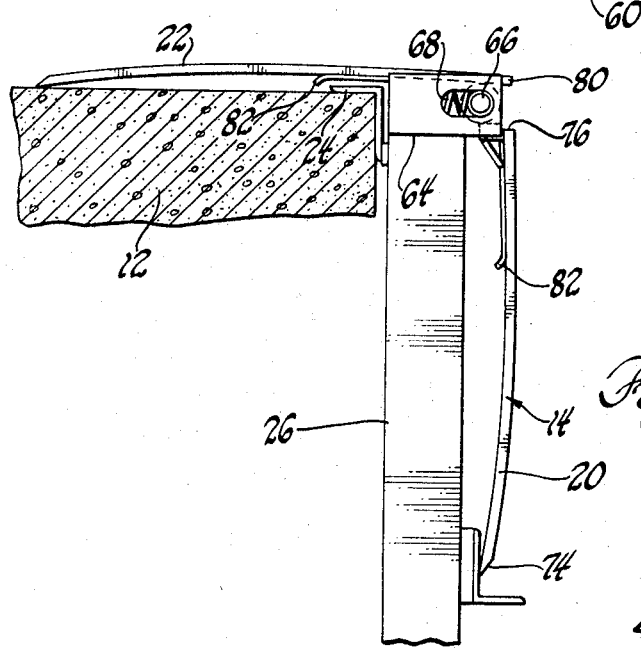
FIGURE 3 is a view similar to FIGURE 2 but showing an end load position.

The lip section 20 includes an outward edge 74 for engaging the bed of a vehicle, as best illustrated in full lines in FIGURE 2, and an inward edge 76, as best illustrated in FIGURES 3 and 9, the inward edge 76 being disposed adjacent the shaft means 66. Likewise, the platform section 22 includes an outward edge 78 for engaging the upper surface of the dock 12 and an inward edge 80, as best illustrated in FIGURES 3 and 9, the inward edge 80 being disposed adjacent the shaft means 66. A biasing means comprising the springs 82 interconnects the lip section 20 and the platform section 22 to urge the inward edges 76 and 80 toward abutting relationship with one another. That is, the springs 82 bias the lip and platform sections toward one another. The springs 82 are wrapped about the shaft means 66 and engage the underside of the lip and platform sections 20 and 22 respectively. Preferably, the springs 82 are not strong enough to urge the lip section 20 and the platform section 22 completely together but do aid in the manual lifting of the platform section 22 from the position illustrated in FIGURE 3 when the lip section is in the vertical position illustrated in FIGURE 3. In other words, the springs 82 urge the platform section 22 toward the vertical position when the platform section is in the end load position illustrated in FIGURES 3 and 9.

Locking means, generally indicated at 84, is included for selectively preventing relative rotation between the lip section 20 and the platform section 22 and is selectively operable to allow relative rotation between the lip section 20 and the platform section 22. The locking means 84 prevents relative rotation between the lip section 20 and the platform section 22 so that when the ramp 14 is in the vertical stored position illustrated in phantom in FIGURE 2, an operator may grasp the platform section by way of the aperture 89 to lift the ramp 14 and the carriage means 18 upward while rotating the ramp 14 toward the horizontal position as illustrated in phantom in FIGURE 2. Thereafter, the carriage means 18 is allowed to move vertically downward so that the ramp is disposed in the cross traffic position illustrated in full lines in FIGURE 2.

The moment created by the lip section 20 about the axis of the shaft means 66 is greater than the moment provided by the platform section 22 so as to bias the lip and platform sections to the vertical position illustrated in phantom in FIGURE 2 when they are locked together. Thus, when a vehicle pulls away from the dock, the weight of the lip section 20 will rotate the platform section to the vertical stored position illustrated in phantom in FIGURE 2. More specifically a greater moment is provided by the lip section 20 because the outward edge 74 thereof is at a greater distance from the axis of the shaft means 66 than is the outward edge 78 of the platform section 22. Furthermore, the inward edge 76 of the lip section 20 and the inward edge 80 of the platform section 22 are offset relative to the axis of the shaft means 66, i.e., the common axis of rotation of the lip and platform sections.

In the event the bed of a truck is positioned adjacent the dock and has cargo loaded right to the end thereof so that the lip section 20 cannot be positioned on the bed of a truck, the locking means 84 may be operated to allow the platform section 22 to be moved to the end load position illustrated in FIGURES 3 and 9.

The locking means 84 includes a stop means comprising the plate 86 which extends from the angle iron member 24 of the support frame means 16 and is movable between a first position for preventing relative rotation between the lip section 20 and the platform section 22 and a second position in engagement with the plate 86 to allow rotation of the platform section 22 while preventing rotation of the lip section 20. More specifically, the locking means 84 includes a pair of spaced first and second brackets 88 and 90 respectively. Each of the brackets 88 and 90 is attached to the lip section 20 through one of the tubular members 70. Thus, each of the brackets 88 and 90 moves with the lip section 20. The brackets 88 and 90 slidably support a sliding rod 92 which is movable between the first position for coacting between the lip section and the platform section and a second position coacting between the lip section and the support frame means 16 through the plate 86. A pin 94 extends through the rod 92 and a spring 96 is disposed about the rod 92 and reacts between the bracket 90 and the pin to urge the rod 92 into and through the bracket 88 so as to extend from the opposite side thereof to coact with a plate 98 to prevent relative rotation between the lip section 20 and the platform section 22. The plate 98 is secured to the platform section 22. As best illustrated in FIGURE 7, the rod 92 has a tapered end which normally engeges the edge of the plate 98 to prevent relative rotation between the lip section 20 and the platform section 22. The plate 86 has a hole 87 therein for receiving the other end of the rod 92. A lever 100 is rotatably connected by the members 102 to the plate 98 for engaging the tapered end of the rod 92 to move the rod 92 against the action of the spring 96 so that the other end thereof moves into the hole 87 of the support plate 86 to prevent rotation of the lip section 20 while allowing the plate 98 to move past the tapered end of the rod whereby the platform section 22 may rotate independently of the lip section 20. This is best illustrated in FIGURE 7 wherein the lever 100 has been rotated and to move the tapered end of the rod 98 sufficiently to allow the plate 98 to move therepast. After the plate 98 moves past the tapered end of the rod 92, the tapered end of the rod 92 bears against the plate 98 as the platform section 22 rotates about the axis of the shaft means 66.

Normally, the lip section 20 and the platform section 22 are disposed in the vertical stored position illustrated in FIGURE 1 with the platform section 22 extending above the upper level of the dock and the locking means 84 in the position illustrated in FIGURE 5 so as to prevent relative rotation between the lip section 20 and the platform section 22. If there is sufficient room on the bed of a truck which is positioned adjacent the dock, an operator may grasp the platform section 22 by the hole 89 to move the carriage means 18 vertically upward while rotating the ramp 14 toward the horizontal position as illustrated in phantom in FIGURE 2. Thereafter, the carriage means 18 is allowed to move vertically downward so that the lip section 20 engages the bed of a truck and the platform section 22 engages the dock, i.e., the cross traffic position illustrated in full lines in FIGURE 2. When the ramp 14 is in the cross traffic position illustrated in full lines in FIGURE 2 and a vehicle pulls away from the dock, the weight of the lip section 20 overcomes the weight of the platform section 22 to rotate the two sections to the vertical stored position illustrated in phantom in FIGURE 2.

When the ramp 14 is in the vertical stored position illustrated in phantom in FIGURE 2 with the lip section 20 locked to the platform section 22 and the bed of a truck disposed adjacent the dock is loaded with cargo right to the end thereof so that the lip section 20 cannot be disposed thereon, the lever 100 may be rotated to move the rod 92 to the position illustrated in FIGURE 2 with one end in the hole 87 of the plate 86 to prevent upward rotation of the lip section 20 while allowing rotation of the platform section 22. Thus, the platform section 22 may be rotated to the end load position illustrated in FIGURES 3 and 9. The weight of the platform section 22 overcomes the biasing action of the springs 82 but the lip section 20 must be locked to the support frame means or the lip section 20 would rotate upwardly under the biasing action of the springs 82 when the platform section 22 is moved to the horizontal end load position. The springs 82, however, aid in rotating the platform section 22 from the horizontal end load position illustrated in FIGURES 3 and 9 to the vertical stored position, in which position the plate 98 will move out of engagement with the tapered end of the rod 92 so that the rod 92 moves into engagement with the edge of the plate 98 to lock the lip section 20 and the platform section 22 together to prevent relative rotation therebetween.

A modification of the dockboard is illustrated in FIGURES 10 and 11 and includes the channel members 26' and 30'. The channel members 26' and 30' differ from the channel members 26 and 30 in that the rollers are attached to the channel member 26' instead of 30'; however, it will be understood that the rollers may be attached to either channel member. Thus, the rollers 36' are supported by the channel member 26' through the plates 38'. Also included are a plurality of rollers, only one of which is shown at 34', which are movable in a horizontal direction to provide yieldable means operatively interconnecting the support frame means and the carriage means for allowing the carriage means to move horizontally relative to the support frame means. In other words, the channel member 30' may move horizontally relative to the fixed channel members 26'. The roller 34' is rotatably supported by a shaft 120 and the shaft 120 is supported by the lever 122. The lever 122 is pivotally supported on a stud shaft 124. Below the stud shaft 124 a pair of springs 126 coact between opposite sides of the lever 122 and the channel member 26' to maintain the lever 122 substantially in the position shown with the roller 34' in rolling contact with the channel. One of the springs 126 is compressed when the channel members 30' are moved horizontally relative to the channel members 26'.

Thus, in addition to the yieldable support of the shaft means 66 in the block-like members 64 which allows the shaft means 66 to move horizontally or rectilinearly in the event a vehicle contacts the ramp, the yieldable means illustrated in FIGURES 10 and 11 may be utilized so that the channel members 30' may move horizontally or rectilinearly in the event the ramp or any portion of the carriage means is contacted by a vehicle.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A dockboard adapted to be attached to a dock and comprising: a ramp adapted to extend between a dock and an adjacent vehicle when in a cross traffic position; and means for storing said ramp in a substantially vertical position so as to extend at least partially above dock level and allowing said ramp to move to said cross traffic position, and vice versa; said ramp including a lip section which extends below dock level in said stored position and a platform section which normally extends above dock level in said stored position, said lip section and said platform section being pivotally supported by said means through a pivotal connection for rotation about a common axis relative thereto, said lip section and said platform section extend from said pivotal connection to respective unsupported distal outward edges, said platform section being rotatable independently of said lip section for engaging the upper surface of a dock to define an end load position of said ramp.

2. A dockboard as set forth in claim 1 including biasing means urging said platform section toward said vertical position when in said end load position.

3. A dockboard as set forth in claim 1 including locking means for preventing relative rotation between said lip section and said platform section and selectively operable to allow such relative rotation.

4. A dockboard as set forth in claim 1 including support frame means adapted to be attached to a dock, carriage means guidably supported for vertical movement by said support frame means, and shaft means supported by said carriage means, said lip section and said platform section being rotatably connected to said shaft means for rotation about said common axis.

5. A dockboard as set forth in claim 4 wherein said support frame means includes means for limiting vertical movement of said carriage means and supporting said carriage means when said ramp is in said stored position and when said platform section is in said end load position so that traffic may pass thereover between a vehicle and a dock.

6. A dockboard as set forth in claim 4 including yieldable means interconnecting said support frame means and said carriage means for allowing said carriage means to move horizontally relative to said support frame means.

7. A dockboard as set forth in claim 4 wherein said lip section includes said outward edge for engaging a vehicle and an inward edge disposed adjacent said shaft means, said platform section includes said outward edge for engaging a dock and an inward edge disposed adjacent said shaft means, and biasing means interconnecting said lip section and said platform section to urge said sections to rotate toward one another.

8. A dockboard as set forth in claim 7 including locking means having a first position for preventing relative rotation between said lip section and said platform section.

9. A dockboard as set forth in claim 8 including stop means extending from said support frame means and wherein said locking means is movable to a second position in engagement with said stop means to allow rotation of said platform section while preventing rotation of said lip section.

10. A dockboard as set forth in claim 9 wherein said lip section provides a greater moment for rotating about said common axis than said platform section so as to bias said lip and platform sections to said vertical position when locked together.

11. A dockboard as set forth in claim 10 wherein the distance between said common axis of rotation and the outward edge of said lip section is greater than the distance between said axis and said outward edge of said platform section so that said sections are biased to said vertical position when locked together.

12. A dockboard as set forth in claim 11 wherein said shaft means is yieldably supported by said carriage means for allowing said shaft means and said lip and platform sections to move horizontally relative to said carriage means.

13. A dockboard as set forth in claim 12 wherein said inward edge of said lip section and said inward edge of said platform section are offset relative to said common axis of rotation.

14. A dockboard as set forth in claim 13 including a counterweight which nearly counterbalances the weight of said ramp and said carriage means so that said ramp automatically returns to said stored position where said carriage means is supported by said support frame means.

15. A dockboard as set forth in claim 14 including rollers operatively interconnecting said support frame means and said carriage means, at least one pulley attached to said support frame means, and at least one cord-like strand attached to said carriage means and passing over said pulley and attached to said counterweight.

16. A dockboard adapted to be attached to a dock and comprising; support frame means adapted to be attached to a dock, carriage means movably supported by said support frame means, a lip section and a platform section each supported through a pivotal connection by said carriage means for rotation independently of one another about a common axis, said lip section and said platform section extend from said pivotal connection to respective unsupported distal outward edges, and locking means for selectively preventing relative rotation between said lip section and said platform section so that the outward edge of said lip section may be disposed on a vehicle adjacent the dock while the outward edge of said platform section may be disposed on the dock.

17. A dockboard as set forth in claim 16 including bumper means attached to said support frame means and extending over said at least a portion of said support frame means and said carriage means for protecting same.

18. A dockboard as set forth in claim 16 wherein said locking means includes a sliding rod movable between a first position coacting between said lip section and said platform section and a second position coacting between said lip section and said support frame means.

19. A dockboard as set forth in claim 18 including a pair of spaced first and second brackets attached to said lip section for movement therewith and slidably supporting said rod, a first plate attached to said platform section and disposed adjacent said first bracket, a pin extending through said rod, a spring disposed about said rod and reacting between said second bracket and said pin to urge said rod into said first bracket so as to extend from the opposite side thereof to coact with said first plate to prevent relative rotation between said lip section and said platform section, a second plate attached to said support frame means and disposed adjacent said second bracket, said second plate having a hole therein for receiving said rod, and a lever rotatably connected to said first plate and engageable with said rod to move said rod against the action of said spring and into the hole in said second plate to prevent rotation of said lip section while allowing said first plate to move past said rod whereby said platform section may rotate independently of said lip section.

20. A dockboard adapted to be attached to a dock and comprising; support frame means adapted to be attached to a dock, carriage means movably supported by said support frame means for vertical movement relative thereto, a ramp rotatably supported by said carriage means, and yieldable means operatively interconnecting said support frame means and said carriage means for allowing said carriage means to move horizontally relative to said support frame means.

21. A dockboard as set forth in claim 20 wherein said yieldable means includes a plurality of rollers movably supported by said support frame means and biased into rolling engagement with said carriage means.

(References on following page)

References Cited

UNITED STATES PATENTS

| | | | |
|---|---|---|---|
| 747,899 | 12/1903 | Wall | 14—71 |
| 1,993,261 | 3/1935 | Colgate | 14—71 |
| 2,639,450 | 5/1953 | Ramer | 14—71 |
| 2,750,609 | 6/1956 | Jaseph | 14—71 |
| 2,974,336 | 3/1961 | Kelley | 14—71 |
| 3,018,496 | 1/1962 | Hosbein | 14—71 |
| 3,228,355 | 1/1966 | Black | 14—71 X |
| 3,288,522 | 11/1966 | Norton | 14—71 X |

NILE C. BYERS, JR., *Primary Examiner.*

UNITED STATES PATENT OFFICE
CERTIFICATE OF CORRECTION

Patent No. 3,426,377                           February 11, 1969

Robert C. Beckwith et al.

It is certified that error appears in the above identified patent and that said Letters Patent are hereby corrected as shown below:

Column 5, line 52, "98", first occurrence, should read -- 92 --. Column 8, after line 73, insert the following claim:

22. A dockboard adapted to be attached to a dock and comprising; support frame means for attachment to a dock, carriage means movably supported by said support frame means, a lip section and a platform section each supported through a pivotal connection by said carriage means for rotation together and independently of one another about a common axis, said lip section and said platform section extend from said pivotal connection to respective unsupported distal outward edges, and means movable between first and second positions for maintaining said lip and platform sections generally aligned when in said first position and for maintaining said platform section generally perpendicular to said lip section when in said second position.

In the heading to the printed specification, line 7, "21 Claims" should read -- 22 Claims --.

Signed and sealed this 24th day of March 1970.

(SEAL)
Attest:

EDWARD M. FLETCHER, JR.                  WILLIAM E. SCHUYLER, JR.
Attesting Officer                             Commissioner of Patents